United States Patent
Nakagaito et al.

(10) Patent No.: US 7,445,553 B2
(45) Date of Patent: Nov. 4, 2008

(54) DAMPER DISC ASSEMBLY

(75) Inventors: Satoshi Nakagaito, Kariya (JP); Masaru Ebata, Chita (JP); Nobuki Fukaya, Takahama (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 243 days.

(21) Appl. No.: 10/950,642

(22) Filed: Sep. 28, 2004

(65) Prior Publication Data
US 2005/0070363 A1 Mar. 31, 2005

(30) Foreign Application Priority Data
Sep. 30, 2003 (JP) ............... 2003-339351

(51) Int. Cl.
*F16F 15/121* (2006.01)
(52) U.S. Cl. .................................. 464/68.91
(58) Field of Classification Search ............... 464/64.1, 464/68.9, 68.91, 68.92; 192/55.3, 203, 209, 192/211; 267/33, 169, 140.11, 249
See application file for complete search history.

(56) References Cited

U.S. PATENT DOCUMENTS

| | | | | |
|---|---|---|---|---|
| 330,445 A | * | 11/1885 | Vose | ........................... 267/33 |
| 937,346 A | * | 10/1909 | Webster | .................. 464/64.1 X |
| 4,148,200 A | * | 4/1979 | Schallhorn et al. | ..... 464/64.1 X |
| 4,714,448 A | * | 12/1987 | Focqueur et al. | ......... 464/68.91 |
| 4,789,374 A | * | 12/1988 | Suzuki | ...................... 464/64.1 |
| 6,227,976 B1 | * | 5/2001 | Rohs et al. | .................. 464/68.9 |
| 2002/0173361 A1 | * | 11/2002 | Uehara | ........................ 464/68 |

FOREIGN PATENT DOCUMENTS

JP 09229138 A 9/1997

* cited by examiner

*Primary Examiner*—Greg Binda
(74) *Attorney, Agent, or Firm*—Buchanan Ingersoll & Rooney PC (57) ABSTRACT

A damper disc assembly includes a drive plate rotatably connected to a driving power source, a driven plate connected to a driven side and being rotatable relative to the drive plate, a damping mechanism adjusted to absorb an impact caused between the drive plate and the driven plate in response to the relative rotation between the drive plate and the driven plate. The damping mechanism positioned at the driven plate. The damping mechanism includes a coil spring, and a torsion damper disposed in the coil spring. The torsion damper includes at least one guiding portion having a predetermined clearance relative to an inner side of the coil spring and a cushion portion integral with the at least one guiding portion inside the guiding portion.

22 Claims, 6 Drawing Sheets

FIG. 8    Conventional work

DAMPER DISC ASSEMBLY

CROSS REFERENCE TO RELATED APPLICATIONS

This application is based on and claims priority under 35 U.S.C. §119 with respect to Japanese Patent Application 2003-339351, filed on Sep. 30, 2003, the entire content of which is incorporated herein by reference.

FIELD OF THE INVENTION

This invention generally relates to a damper disc assembly. More particularly, this invention pertains to a damper included in a flywheel damper disc assembly, in a clutch damper disc, in a drive train system vibration absorber, and so on. This damper is employed in order to absorb vibration due to fluctuation of a torque transmitted from a driving power source.

BACKGROUND

As a conventional torsion damper assembly for a torsion vibration absorbing device, JP09(1997)-229138A2 discloses a torsion damper assembly for a torsional vibration absorbing device. This torsion damper assembly includes a torsion damper idly inside a coil spring disposed between a drive plate connected to a driving power source and a driven plate connected to a driven side such as a transmission. The torsion damper is oriented in a relative rotational direction of the drive plate and the driven plate.

The torsion damper is a cushioning member of approximately cylindrical-shaped and made of an elastic resin material. At least one guiding portion is defined at a major diameter of the torsion damper. A diameter of the guiding portion is designed to be smaller than a minor diameter of the coil spring. That is, there is a predetermined clearance defined between the guiding portion of the torsion damper and an inner side of the coil spring. Therefore, a smooth elastic movement of the coil spring can be allowed.

Further, a diameter of an axially intermediate portion of the torsion damper is designed to be smaller than a diameter of each axially end portion thereof. Therefore, even if the torsion damper is compressed and deformed, the deformed portion of the torsion damper can be prevented from becoming in contact with the coil spring.

However, according to the above-described torsion damper, the diameter of the axially intermediate portion of the torsion damper is designed to be smaller than the diameter of each axially end portion thereof. Further, the guiding portion is defined at the both ends of the torsion damper. Therefore, certain improvements seem to be still expected in assuring a necessary elastic force and a necessary axial length of the guiding portion.

Figure 8:
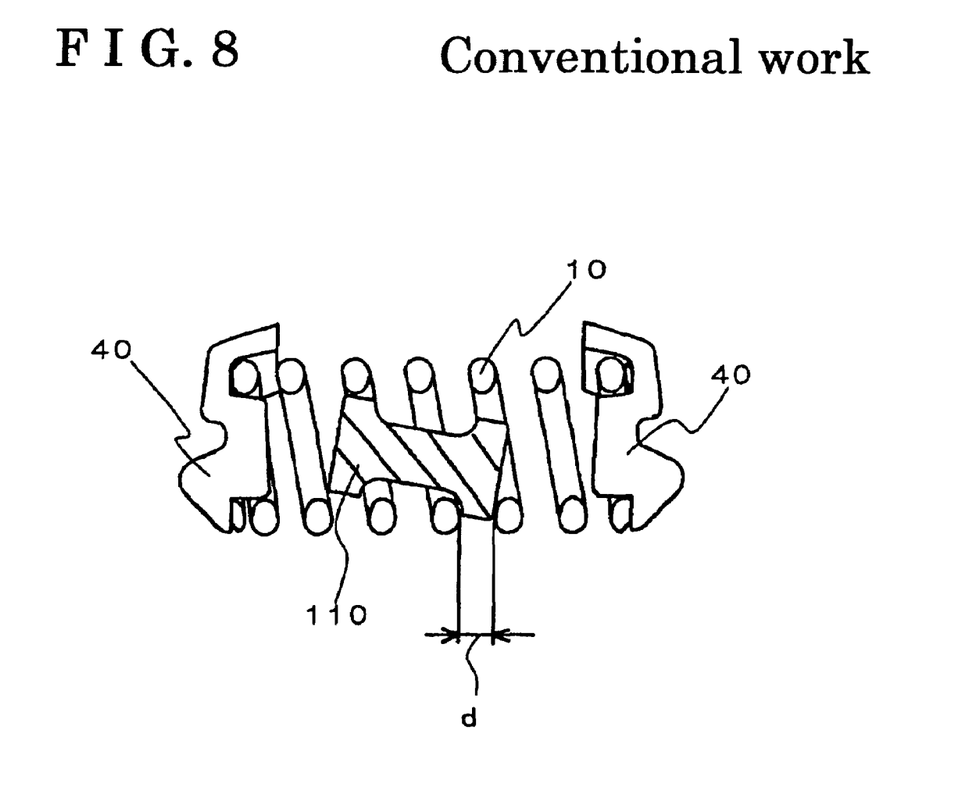
FIG. 8 is a view illustrating a structure of a conventional torsion damper.

The above-described torsion vibration absorbing device such as a flywheel damper disc and a clutch damper disc has been required to have a high response to a high torque characteristic. In this case, a relative rotational angle between the drive plate and the driven plate is increased. Therefore, the torsion damper is hence required to have a shorter axial length. Further, the coil spring of a damping mechanism is hence required to have a large winding pitch. A coil spring, of which spring characteristic varies in response to a compression amount, can be generally an inequality pitch coil spring. This type of coil spring may have a portion of which winding pitch is excessively large. In this case, as illustrated in FIG. 8, when a coil spring 10 has not been compressed yet, an end portion of a torsion damper 110 may drop or sink into a winding pitch, i.e., into a distance between adjacent winding portions of the coil spring 10.

A need exists for providing an improved damper disc assembly which is provided with a torsion damper that can be prevented from an unnecessary contact with an expanded or contracted coil spring

SUMMARY OF THE INVENTION

According to an aspect of the present invention, a damper disc assembly includes a drive plate rotatably connected to a driving power source, a driven plate connected to a driven side and being rotatable relative to the drive plate, a damping mechanism adjusted to absorb an impact caused between the drive plate and the driven plate in response to the relative rotation between the drive plate and the driven plate. The damping mechanism positioned at the driven plate. The damping mechanism includes a coil spring, and a torsion damper disposed in the coil spring. The torsion damper includes at least one guiding portion having a predetermined clearance relative to an inner side of the coil spring and a cushion portion integral with the at least one guiding portion inside the guiding portion.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be described hereinbelow in detail with reference to the accompanying drawings. Description is given by taking a damper disc assembly as an example for a torsion vibration absorbing device. The damper disc assembly is disposed in a flywheel (not shown) positioned between a vehicle engine and a transmission and is provided with a torsion damper.

Figure 1:
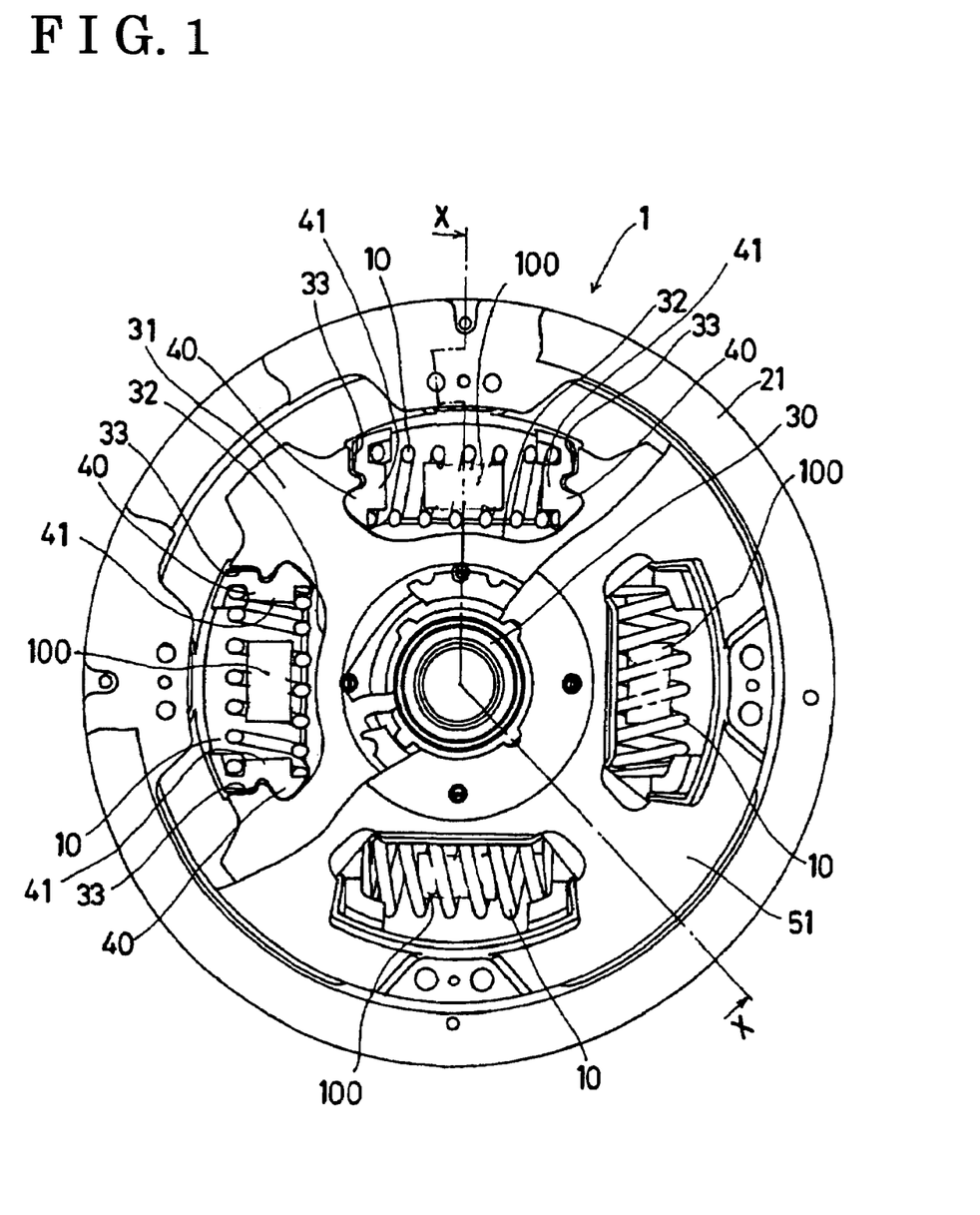
FIG. 1 is a part cutaway view of a damper disc of a damper disc assembly according to embodiments of the present invention.
Figure 2:
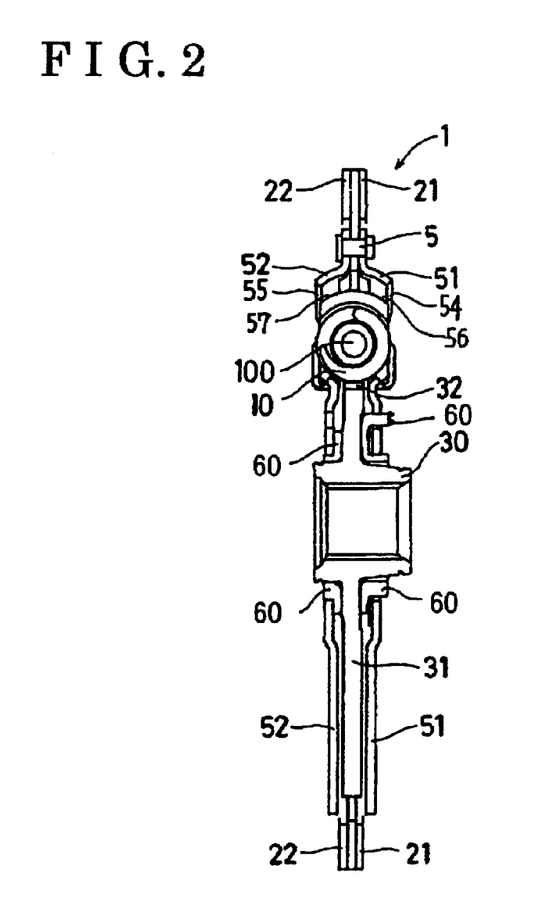
FIG. 2 is a side view of the damper disc assembly taken along a line X-X in FIG. 1.

As illustrated in FIGS. 1 and 2, frictional members 21 and 22 are fixed at outer circumferential surfaces of a damper disc assembly 1 and face each other. The frictional members 21 and 22 can be riveted at the damper disc assembly 1. The flywheel is connected to a crankshaft of a vehicle engine as a driving power source. A pressure plate (not shown) is bolted down at the flywheel and is biased towards the flywheel by a disc spring as a torque limiter for limiting a torque to be transmitted from the engine to a driven side or driven device such as a transmission. The frictional members 21 and 22 are frictionally engaged with the rotating flywheel and the pressure plate and rotates integrally with the flywheel.

The damper disc assembly 1 is further provided with a hub 30 integral with a flange portion 31 extending radially outwardly. The flange portion 31 serves as a driven plate. The hub 30 is spline-engaged with an input shaft (not shown) of the transmission. Therefore, the damper disc assembly 1 can transmit a torque generated between the flywheel and the input shaft.

At least one housing portion 32 is defined at an outer circumferential portion of the flange portion 31. The housing portion 32 houses a coil spring 10 therein. According to the embodiments of the present invention, four housing portions 32 are defined at outer circumferential portions of the flange portion 31 and are arranged with a substantially equal pitch to each adjacent housing portion 32. Each housing portion 32 houses the coil spring 10 therein. In details, there are seats 40 at both ends of the housing portion 32. The coil spring 10 is hence housed in the housing portion 32 via the seats 40. A torsion damper 100 is idly disposed inside the coil spring 10. The coil spring 10 and the torsion damper 100 together constitute a damper mechanism. When the hub 30 rotates, the coil spring 10 is applied with a pushing force by walls 33 of the housing portion 32 via the seats 40.

As illustrated in FIG. 2, the frictional members 21 and 22 are riveted at both surfaces of an outer peripheral portion of a drive plate 51 of the damper disc assembly 1. The drive plate 51 is also riveted with a sub-drive plate 52 at an inner side of the drive plate 51 relative to the frictional members 21 and 22. The flange portion 31 of the hub 30 and the coil springs 10 are held by the drive plate 51 and the sub-drive plate 52. The drive plate 51 and the sub-drive plate 52 are supported to be approximately coaxial with the hub 30 and to be rotatable relative to the hub 30 via a bush, i.e., a thrust member 60 serving as a bearing. The drive plate 51 includes window holes 54 that are arranged in an approximately circumferential or tangential direction thereof, while the sub-drive plate 52 includes window holes 55 in an approximately circumferential or tangential direction thereof. Each of the window holes 54 and 55 are defined substantially corresponding to each housing portion 32 at the flange portion 31 of the hub 30. Therefore, each of the window holes 54 and 55 can house the coil spring 10 via the seats 40. In the same manner as the housing portion 32 of the hub 30, the coil spring is applied with a pushing force by walls 56 and 57 of the window holes 54 and 55 when the drive plate 51 rotates.

Next, following explanation will be given for explaining a torque transmission via the damper disc assembly 1 according to the embodiments of the present invention.

When a vehicle is accelerated, i.e., when a driver depresses an accelerator pedal, a driving torque is transmitted from the engine or motor to the flywheel. A frictional engagement force is generated when the frictional members 21 and 22 are held by the flywheel and the pressure plate. Therefore, the driving torque is transmitted to the drive plate 51 and the sub-drive plate 52 via the frictional engagement force. At this point, the drive plate 51 and the sub-drive plate 52 rotate relative to the hub 30. Each coil spring 10 is then applied with the pushing force via the seat 40, which is disposed at one end of the coil spring 10, by the walls 56 and 57, and is compressed. The other end of the compressed coil spring 10 pushes the wall 33 of the housing portion 32 at the flange portion 31 of the hub 30 because a restoring force has been generated at the compressed coil spring 10. As described above, the driving torque is transmitted to the hub 30 and is further transmitted to the input shaft of the transmission. When a vehicle is decelerated, i.e., when a driver reduces a depressing force at the accelerator pedal, a torque for rotating the engine by a vehicle wheel is transmitted to the drive plate 51 from the hub 30 via each coil spring 10 and the seats 40.

The torque to be transmitted between the engine and the transmission input shaft may widely fluctuate in response to a vehicle shift stage change or due to a sudden torque-up by the driving power source. In this case, the relative rotation between the drive plate 51 and the hub 30 may be increased. When the relative rotational angle reaches a predetermined angle, the torsion damper 100 impacts with contact portions 41 of the seats 40 disposed at the both ends of each coil spring 10. As a result, the torsion damper 100 elastically deforms, and the torque is transmitted to the hub 30 from the driving power source via the deformed torsion damper 100. The impact torque caused at the impact between the torsion damper 100 and the seats 40 can be absorbed in favor of an elastic property of the torsion damper 100, thereby enabling to restrain a peak value of the impact torque.

Next, following explanation will be given for explaining the torsion damper 100.

The torsion damper 100 is injection-molded with an elastic resin material. According to the embodiments of the present invention, the torsion damper 100 is made of a thermoplastic polyester estramer, for example. The torsion damper 100 is a cushion that is idly disposed inside the coil spring 100 and is molded to be an approximately cylindrical shaped structure. A major diameter of the torsion damper 100 is designed to be smaller than an inner diameter of the coil spring 10. According to the embodiments of the present invention, the major diameter of the torsion damper 100 is smaller than the inner diameter of the coil spring 10 with a dimensional difference of 0.6 mm. When the relative rotational angle between the drive plate 51 and the hub 30 reaches the predetermined angle, the torsion damper 100 impacts with the contact portions 41 of the seats 40 and elastically deforms. In this case, the torsion damper 100 can transmit the torque from the engine to the hub 30. Further, the impact shock between the torsion damper 100 and the drive plate 51 (i.e., the seats 40) can be effectively absorbed by the elastic deformation of the torsion damper 100. Still further, the torsion damper 100 has a minor diameter portion in light of a deformation amount of the compressed torsion damper 100.

Next, following explanation will be given for explaining each embodiment of the present invention.

Figure 3A:
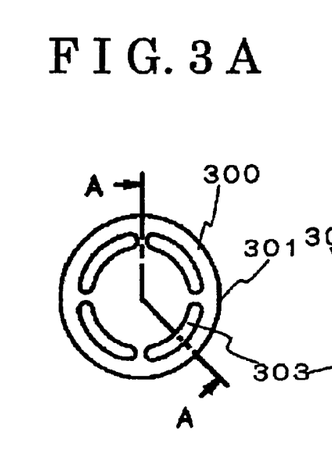
FIG. 3A is a front view illustrating a torsion damper according to the first embodiment of the present invention.
Figure 3B:
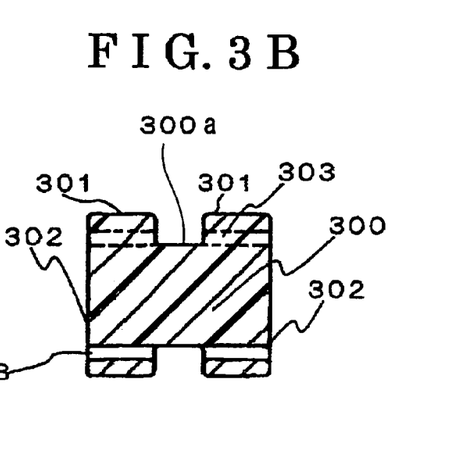
FIG. 3B is a sectional view illustrating the torsion damper taken along a line A-A in FIG. 3A.

FIGS. 3A and 3B illustrate a torsion damper 300 according to the first embodiment of the present invention. The torsion damper 300 is provided with guiding portions 301 at flange portions, which extend radially outwardly at both ends of the torsion damper 300. The guiding portions 301 are designed not to drop or sink into a clearance (i.e., coil pitch) between winding portions of the coil spring 10. A connecting portion 300a is integrally provided so as to connect the both guiding portions 301. A cushion portion 302 is integrally provided at an inner side of the guiding portions 301. At least one bore 303 (i.e., space) is defined at a circumferential surface of the cushion portion 302 and axially penetrates the guiding portions 301. According to the first embodiment of the present invention, there are four bores 303 defined at the circumferential surface of the cushion portion 302 and axially penetrate the guiding portions 301. When the torsion damper 300 is compressed, deformed portions of the cushion portion 302 and the connecting portion 300a are moved into the bores 303. Therefore, according to the first embodiment of the present invention, a dimension of the major diameter of the guiding portions 301 can be effectively prevented from being changed.

Figure 4:
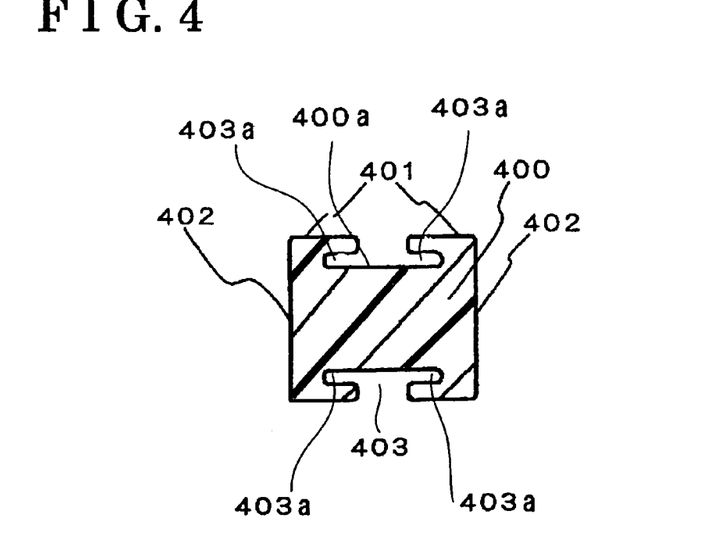
FIG. 4 is a sectional view illustrating a torsion damper according to the second embodiment of the present invention.

FIG. 4 illustrates a torsion damper 400 according to the second embodiment of the present invention. The torsion damper 400 is provided with guiding portions 401, which extends radially outwardly, in the same manner as the torsion damper 300 according to the first embodiment of the present invention. The guiding portions 401 are designed not to drop or sink into a clearance between the wound portions of the coil spring 10. A connecting portion 400a is integrally provided so as to connect the both guiding portions 401. A cushion portion 402 is integrally provided at the inner side of the guiding portions 401. A bore 403 is defined at an axially intermediate portion over an entire circumferential surface between a cushion portion 402 and the guiding portions 401. This bore 403 includes a groove portion 403a extending toward an axially intermediate point of each guiding portion 401. When the torsion damper 400 is compressed, deformed portions of the connecting portion 400a are moved into the groove portion 403a or the bore 403. Therefore, according to the second embodiment of the present invention, a dimension of a major diameter of the guiding portions 401 can be effectively prevented from being changed.

Figure 5:
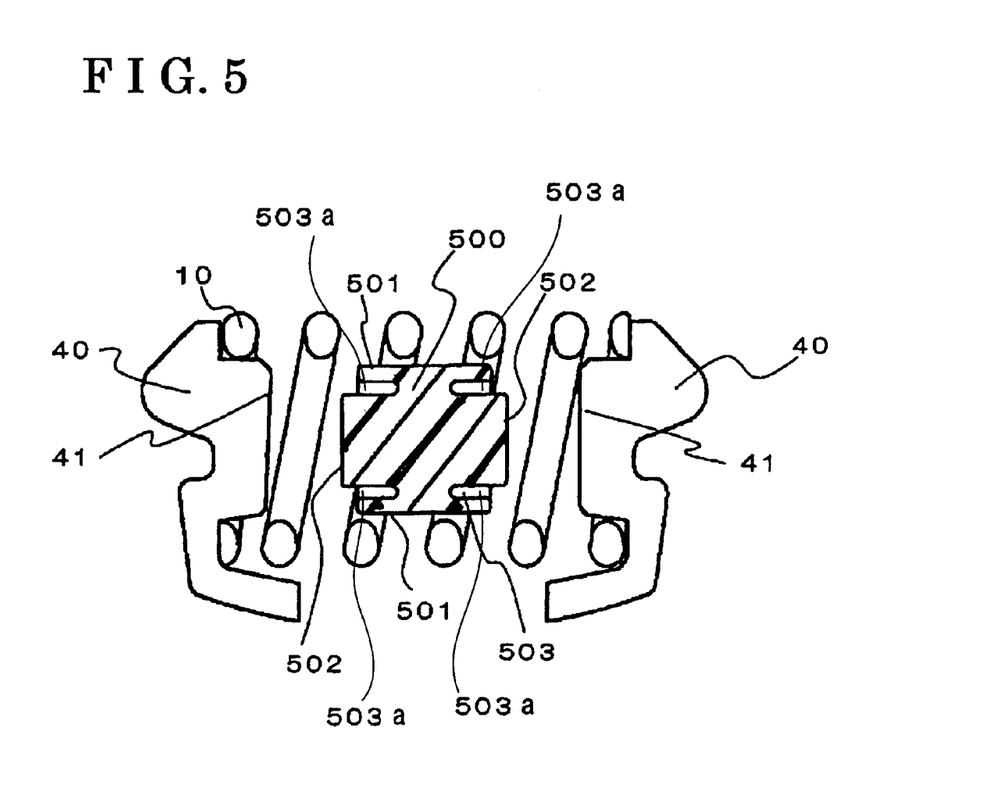
FIG. 5 is a sectional view illustrating a torsion damper according to the third embodiment of the present invention.

FIG. 5 illustrates a torsion damper 500 according to the third embodiment of the present invention. The torsion damper 500 is provided with a cushion portion 502 and a guiding portion 501 extending along an axial direction of the cushion portion 502 integrally from an intermediate portion of the cushion portion 502 towards ends of the torsion damper 500. The guiding portion 501 has a clearance relative to the inner side of the coil spring 10. The guiding portion 501 is designed not to drop or sink into the clearance between the winding portions of the coil spring 10. The torsion damper 500 is further provided with groove portions 503 at both ends thereof, which extend along the axial direction of the torsion damper 500. Each groove portion 503 has an opening 503a opening axially outwardly. When the torsion damper 500 is compressed, deformed portions of the torsion damper 500 are moved into the groove portions 503a. Therefore, according to the third embodiment of the present invention, a dimension of a major diameter of the guiding portions 501 can be effectively prevented from being changed.

Figure 6:
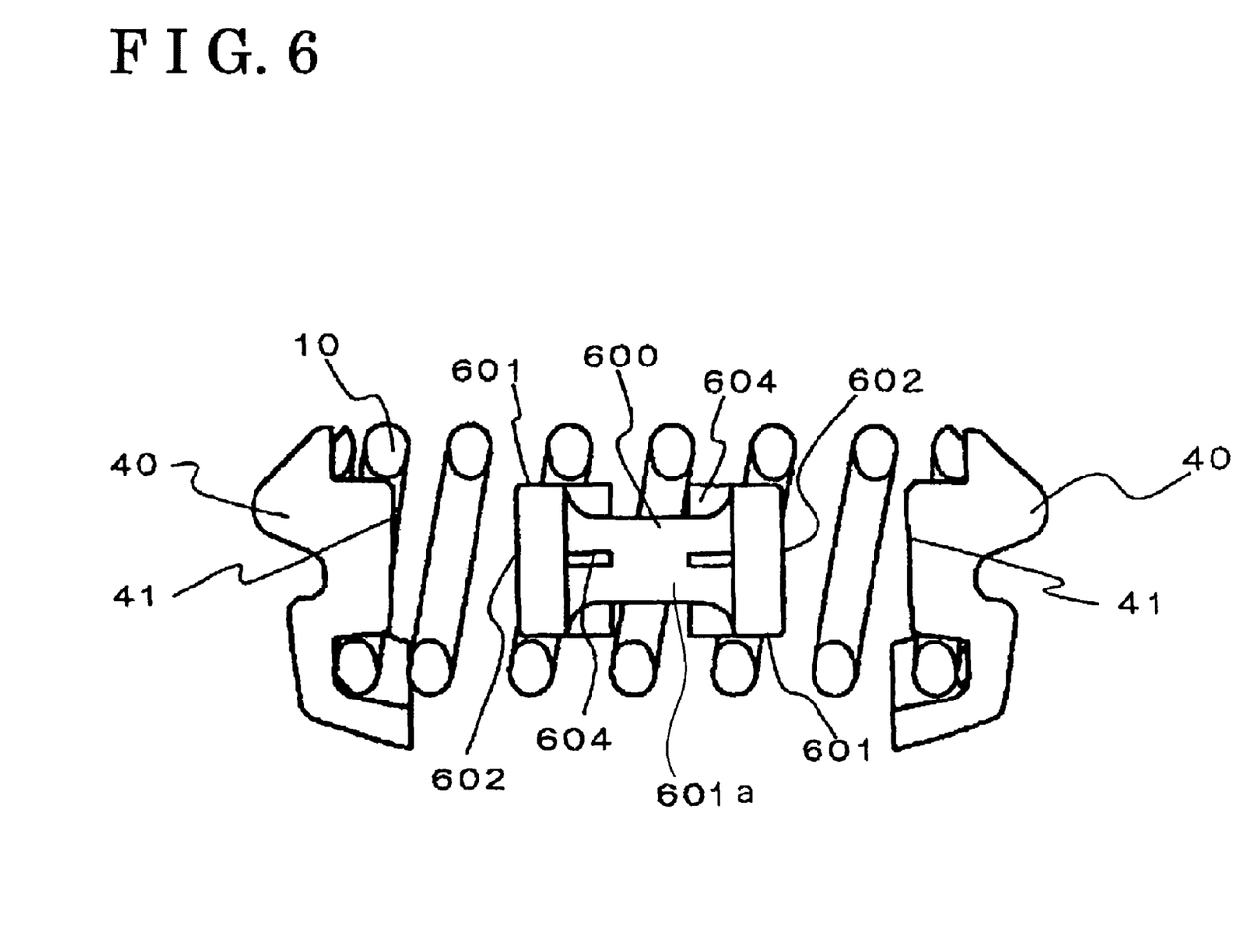
FIG. 6 is a side view illustrating a torsion damper according to the fourth embodiment of the present invention.

FIG. 6 illustrates a torsion damper 600 according to the fourth embodiment of the present invention. The torsion damper 600 is provided with guiding portions 601 at both ends thereof. There is a cushion portion 602 radially inward of the guiding portions 601. The cushion portion 602 allows the torsion damper 600 to deform when being subjected to an external force. The torsion damper 600 is further provided with a connecting portion 601a and plural ribs 604. The connecting portion 601a possesses a major diameter smaller than a major diameter of each guiding portion 601 and connects the guiding portions 601 thereby. According to the fourth embodiment of the present invention, there are the four ribs 604 equipped at each end of the torsion damper 600 towards the axially intermediate portions of the torsion damper 600. The four ribs 604 have a major diameter of which dimension is substantially the same as the major diameter of each guiding portion 601. The ribs 604 and the guiding portions 601 are designed not to drop or sink into the clearance between the winding portions of the coil spring 10. When the torsion damper 600 is compressed, portions, at which the ribs 604 are not equipped, can be deformed. Therefore, according to the fourth embodiment of the present invention, a deformation of the guiding portions 601 can be effectively reduced. That is, when the torsion damper 600 is compressed, the cushion portion 602 and the connecting portion 601a are deformed. Therefore, according to the fourth embodiment of the present invention, a dimension of the major diameter of the guiding portion 601 can be effectively prevented from being changed.

Figure 7:
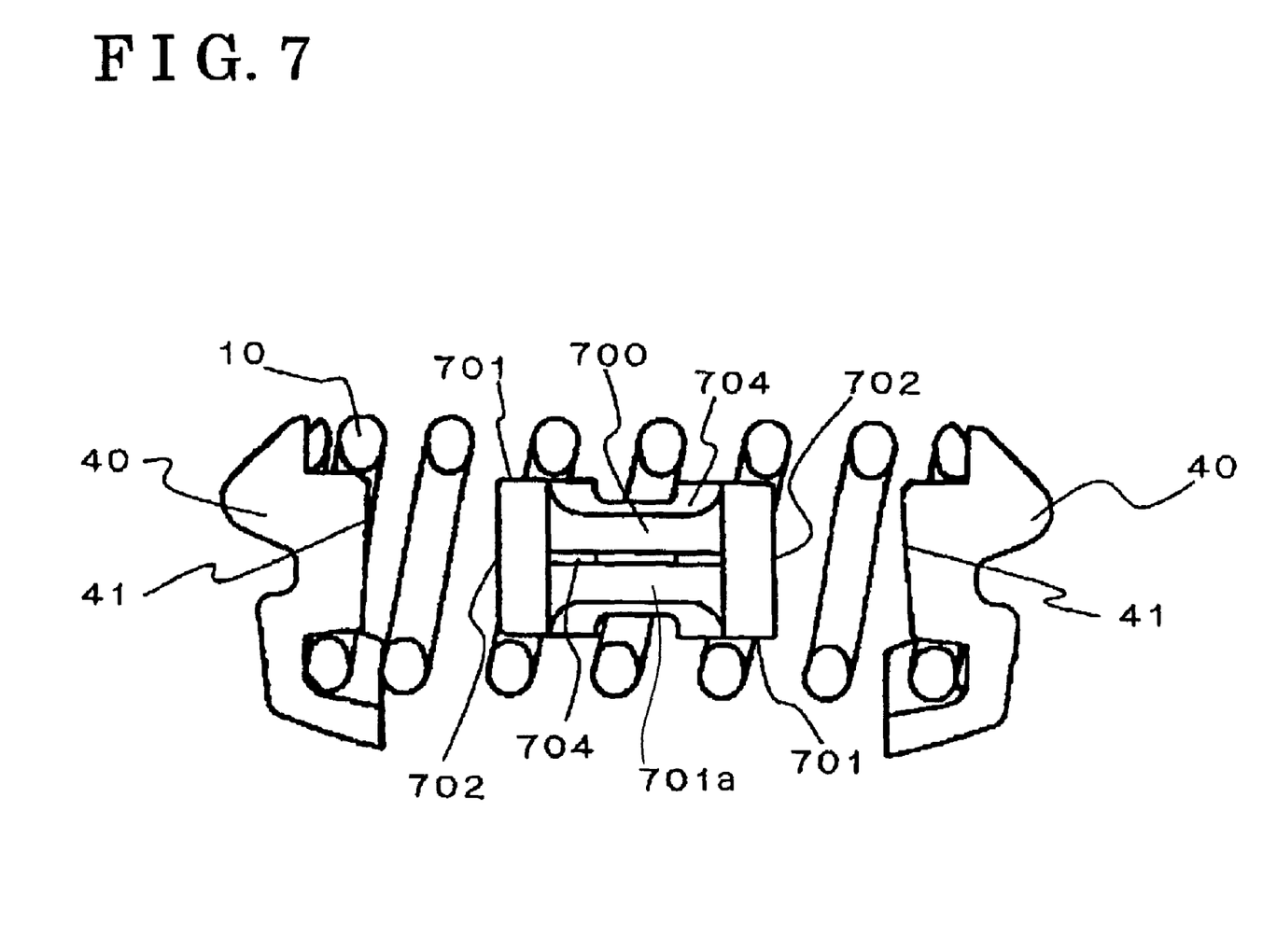
FIG. 7 is a side view illustrating a torsion damper according to the fifth embodiment of the present invention.

FIG. 7 illustrates a torsion damper 700 according to the fifth embodiment of the present invention. There is at least one rib 704 extending from a guiding portion 701 at one end of the torsion damper 700 to the other guiding portion 701 at the other end thereof. A connecting portion 701a is provided at an approximately intermediate portion of the guiding portions 701 so as to connect the both guiding portions 701. A major diameter of the connecting portion 701a is smaller than a major diameter of each guiding portion 701. The at least one rib 704 is formed along the connecting portion 701a. There is a cushion portion 702 at a portion radially inward of the guiding portions 701. The cushion portion 702 allows the torsion damper 700 to deform when being subjected to an external force. When the torsion damper 700 is compressed, portions, at which the rib 704 is not equipped, can be deformed. Therefore, according to the fifth embodiment of the present invention, a deformation of the guiding portions 701 can be effectively reduced. That is, when the torsion damper 700 is compressed, the connecting portion 701a is deformed. Therefore, according to the fifth embodiment of the present invention, a dimension of the major diameter of each guiding portion 701 can be effectively prevented from being changed.

As described above, according to any one of the above embodiments of the present invention, the deformation of the torsion damper can be absorbed by the connecting member connecting the cushioning portion and the guiding portion. The structure of the torsion damper is not limited to the above-described structures, and yet can be any structures as far as the torsion damper has been designed in light of the clearance between the winding portions of the coil spring, and can absorb the compression thereof.

The principles, embodiments and modes of operation of the present invention have been described in the foregoing specification and drawings. However, the invention which is intended to be protected is not to be construed as limited to the particular embodiments disclosed. Further, the embodiments described herein are to be regarded as illustrative rather than restrictive. Plural objectives are achieved by the present invention, and yet there is usefulness in the present invention as far as one of the objectives are achieved. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A damper disc assembly comprising:
   a drive plate adapted to be rotatably connected to a driving power source;
   a driven plate adapted to be connected to a driven device and being rotatable relative to the drive plate; and
   a damping mechanism adjusted to absorb an impact caused between the drive plate and the driven plate in response to the relative rotation between the drive plate and the driven plate, the damping mechanism positioned between the driven plate and the drive plate;
   the damping mechanism including:
      a coil spring possessing opposite ends that engage respective first and second spring seats;
      a torsion damper disposed in the coil spring, the torsion damper including at least one guiding portion having an outer diameter smaller than an inner diameter of the coil spring and a cushion portion integral with the at least one guiding portion inside the guiding portion and a common cross section in the radial direction of the torsion damper with regard to both the at least one guiding portion and the cushion portion;
      the guiding portion has a part located on an outer side in the radial direction from a visible outline of the cushion portion on the common cross section, and
      the torsion damper being deformed after a deformation of the coil spring.

2. A damper disc assembly according to claim 1, wherein at least the one guiding portion is a flange portion projecting radially outwardly at both ends of the torsion damper.

3. A damper disc assembly according to claim 2, wherein the flange portion having at least the one guiding portion includes a space penetrating in an approximately axial direction of the torsion damper.

4. A damper disc assembly according to claim 3, wherein the flange portion of at least the one guiding portion includes a groove portion extending in the approximately axial direction of the torsion damper.

5. A damper disc assembly according to claim 4, wherein the groove portion is defined over an entire circumferential direction of the flange portion.

6. A damper disc assembly according to claim 1, wherein the at least one guiding portion is a flange portion defined at an approximately intermediate portion of the torsion damper.

7. A damper disc assembly according to claim 6, wherein the flange portion having at least the one guiding portion includes a groove portion extending in an approximately axial direction of the torsion damper.

8. A damper disc assembly according to claim 7, wherein at least the one groove portion is defined at a side surface of the flange portion and has an opening that opens towards one end of the torsion damper.

9. A damper disc assembly according to claim 1, wherein the torsion damper includes plural ribs of which major diameter is substantially the same as a major diameter of the guiding portion.

10. A damper disc assembly according to claim 9, wherein the guiding portion includes flange portions extending radially outwardly at both ends of the torsion damper and a connecting portion connecting the both flange portions.

11. A damper disc assembly according to claim 9, wherein the plural ribs are arranged at four portions with a substantially equal pitch relative to an adjacent rib.

12. A damper disc assembly comprising:
a drive plate adapted to be rotatably connected to a driving power source;
a driven plate adapted to be connected to a driven device and being rotatable relative to the drive plate;
a coil spring and a torsion damper comprising a damping mechanism positioned between the driven plate and the drive plate to absorb an impact between the drive plate and the driven plate in response to the relative rotation between the drive plate and the driven plate;
the coil spring possessing a first end seated on a first spring seat and a second end seated on a second spring seat;
the torsion damper being disposed inside the coil spring and comprising at least one guiding portion having an outer diameter smaller than an inner diameter of the coil spring and a cushion portion integral with the at least one guiding portion and a common cross section in the radial direction of the torsion damper with regard to both the at least one guiding portion and the cushion portion;
the guiding portion has a part located on an outer side in the radial direction from a visible outline of the cushion portion on the common cross section; and
the torsion damper being undeformed during an initial compression of the coil spring.

13. A damper disc assembly according to claim 12, wherein the at least one guiding portion is a flange portion defined at an approximately intermediate portion of the torsion damper.

14. A damper disc assembly according to claim 13, wherein the flange portion having at least the one guiding portion includes a groove portion extending in an approximately axial direction of the torsion damper.

15. A damper disc assembly comprising:
a drive plate adapted to be rotatably connected to a driving power source;
a driven plate adapted to be connected to a driven device and being rotatable relative to the drive plate; and
a damping mechanism adjusted to absorb an impact caused between the drive plate and the driven plate in response to the relative rotation between the drive plate and the driven plate, the damping mechanism positioned between the driven plate and the drive plate;
the damping mechanism including:
a coil spring possessing opposite ends that engage respective first and second spring seats; and
a torsion damper disposed in the coil spring, the torsion damper including at least one guiding portion having an outer diameter smaller than an inner diameter of the coil spring and a cushion portion integral with the at least one guiding portion;
the torsion damper comprising a space between the cushion portion and the guiding portion in a radial direction of the torsion damper; and
the torsion damper being deformed after a deformation of the coil spring.

16. A damper disc assembly according to claim 15, wherein the space is a groove portion.

17. A damper disc assembly according to claim 16, wherein at least the one guiding portion is a flange portion projecting radially outwardly at both ends of the torsion damper, the groove portion is formed in the flange portion to extend in an axial direction of the torsion damper.

18. A damper disc assembly according to claim 17, wherein the groove portion comprises a plurality of circumferentially spaced apart groove portions formed in the flange portion.

19. A damper disc assembly according to claim 17, wherein the groove portion is defined over an entire circumferential direction of the flange portion.

20. A damper disc assembly according to claim 16, wherein the at least one guiding portion is a flange portion defined at an approximately intermediate portion of the torsion damper, the groove portion includes two groove portions, each formed at an axial end of the flange portion, each groove portion having an opening that opens axially outwardly.

21. A damper disc assembly according to claim 16, wherein the at least one guiding portion is a flange portion defined at an approximately intermediate portion of the torsion damper, the groove portion formed at an axial end of the flange portion and has an opening that opens towards one end of the torsion damper.

22. A damper disc assembly according to claim 15, wherein the torsion damper possesses a first end and a second end, the first end of the torsion damper being located closer to the first spring seat than the second spring seat, the first end of the torsion damper being spaced from the first spring seat when no relative rotation occurs between the drive plate and driven plate, and the second end of the torsion damper being spaced from the second spring seat when no relative rotation occurs between the drive plate and the driven plate.

* * * * *